(12) United States Patent
Erke et al.

(10) Patent No.: US 10,460,364 B2
(45) Date of Patent: Oct. 29, 2019

(54) SYSTEM AND METHOD FOR SOCIAL GIFTING AND GIFT REDEMPTION

(71) Applicant: INMAR BRAND SOLUTIONS, INC., Winston-Salem, NC (US)

(72) Inventors: Brian Erke, Seattle, WA (US); Ryan Halper, Seattle, WA (US)

(73) Assignee: INMAR BRAND SOLUTIONS, INC., Winston-Salem, NC (US)

( * ) Notice: Subject to any disclaimer, the term of this patent is extended or adjusted under 35 U.S.C. 154(b) by 834 days.

(21) Appl. No.: 14/051,628

(22) Filed: Oct. 11, 2013

(65) Prior Publication Data
US 2014/0108177 A1 Apr. 17, 2014

Related U.S. Application Data

(60) Provisional application No. 61/712,276, filed on Oct. 11, 2012.

(51) Int. Cl.
*G06Q 30/00* (2012.01)
*G06Q 30/06* (2012.01)

(52) U.S. Cl.
CPC ..... *G06Q 30/0601* (2013.01); *G06Q 30/0635* (2013.01); *G06Q 30/0641* (2013.01)

(58) Field of Classification Search
CPC .................. G06Q 30/0601; G06Q 30/0637
USPC .............................................. 705/26.1, 26.82
See application file for complete search history.

(56) References Cited

U.S. PATENT DOCUMENTS

| | | | | |
|---|---|---|---|---|
| 8,608,059 | B1* | 12/2013 | Miller ................ | G06Q 20/3274 235/379 |
| 2004/0140361 | A1* | 7/2004 | Paul ..................... | G06Q 20/341 235/462.45 |
| 2006/0283935 | A1* | 12/2006 | Henry .................... | G06Q 20/20 235/380 |
| 2010/0017278 | A1* | 1/2010 | Wilen ................... | B42D 15/045 705/14.2 |
| 2011/0047039 | A1* | 2/2011 | Crames ................ | G06Q 20/206 705/18 |
| 2011/0270619 | A1* | 11/2011 | Lovette .............. | G06Q 30/0603 705/1.1 |

(Continued)

OTHER PUBLICATIONS

Gift card promo spurs everyday purchases, Dec. 12, 2011, Racher Press, Inc. (Year: 2011).*

*Primary Examiner* — Brittney N Miller
(74) *Attorney, Agent, or Firm* — Allen, Dyer, Doppelt + Gilchrist, P.A.

(57) ABSTRACT

A social gifting system is described herein that provides digital, personalized gifts that are both temporally and spatially relevant to a gift recipient. The giver can use a mobile application to select a friend, select a gift, and send the gift electronically to the recipient. The recipient can use a mobile computing device to receive the gift, provide a code or other redemption information to a vendor, and then receive the gift. The system provides new ways to make these types of digital gifts easier to redeem through point of sale integration with various common vendor systems. The social gifting system provides a proprietary process flow between the user and merchant staff that is set up for increased ease of use, speed, and simplicity. The social gifting system allows users to send highly personalized gifts in any form, and to bring the price point down.

17 Claims, 3 Drawing Sheets

(56) References Cited

U.S. PATENT DOCUMENTS

| | | | |
|---|---|---|---|
| 2012/0030103 A1* | 2/2012 | Hughes | G06Q 10/00 |
| | | | 705/41 |
| 2013/0144732 A1* | 6/2013 | Rothschild | G06Q 20/0457 |
| | | | 705/17 |
| 2013/0346302 A1* | 12/2013 | Purves | G06Q 20/102 |
| | | | 705/40 |
| 2014/0006123 A1* | 1/2014 | Kepecs | G06Q 30/0601 |
| | | | 705/14.16 |
| 2014/0095356 A1* | 4/2014 | Kepecs | G06Q 30/0617 |
| | | | 705/26.43 |

* cited by examiner

SYSTEM AND METHOD FOR SOCIAL GIFTING AND GIFT REDEMPTION

CROSS-REFERENCE TO RELATED APPLICATIONS

The present application claims priority to U.S. Patent Application Ser. No. 61/712,276 entitled "SOCIAL GIFTING AND EFFICIENT GIFT REDEMPTION," and filed on 2012-10-11, which is hereby incorporated by reference.

BACKGROUND

As of now, the gifting industry as it relates to experience-based merchants (hospitality, ticketing, golf, skiing, any place that sells a service that needs to be experienced in-person to be consumed) is still reliant upon physical gift cards and antiquated delivery methods. To give the gift of a meal or other experience, the giver visits the merchant, purchases a physical gift card for a standardized dollar amount, and physically hands or sends the gift card to the gift recipient. The giver can also have the merchant mail the gift certificate to the gift recipient. Either way the process takes effort and time to coordinate the delivery method, and there are extra costs: time to get to the merchant, order online, postage costs, and so forth.

Gift cards can be impersonal. A gift means a lot more when it is clear that the gift giver put time and thought into making the gift personal, and went the extra mile to personalize the gift to the recipient's tastes. Giving a gift card of stored value also bears with it a minimum monetary threshold to be deemed acceptable as a gift, which, to most people is around $20 or more. Yet, when you are at a friend or acquaintance's birthday, it is perfectly acceptable to buy them a $7 beer as a nice way of saying happy birthday. In addition, gift card recipients often misplace physical gift cards or lose them.

Some online systems have attempted to solve these problems, but generally fall into the category of making one or more parts of the gift card process digital. For example, gift givers can go to a store's website to purchase a gift card, can send the gift card by email, and so forth. Gift recipients can receive "e-gift cards" which are simply a barcode or other electronic representation of the classic gift card concept. These types of electronic gift cards still suffer from the problems of not being very personal, having a high threshold acceptable amount, and so forth. Moreover, current gifting systems are not timely or social in nature. There is no way to give a gift to someone that is relevant at the time and place that person is located, other than the gift giver being physically present and buying the recipient something (e.g., paying for the recipient's drink or meal).

DETAILED DESCRIPTION

Figure 1:
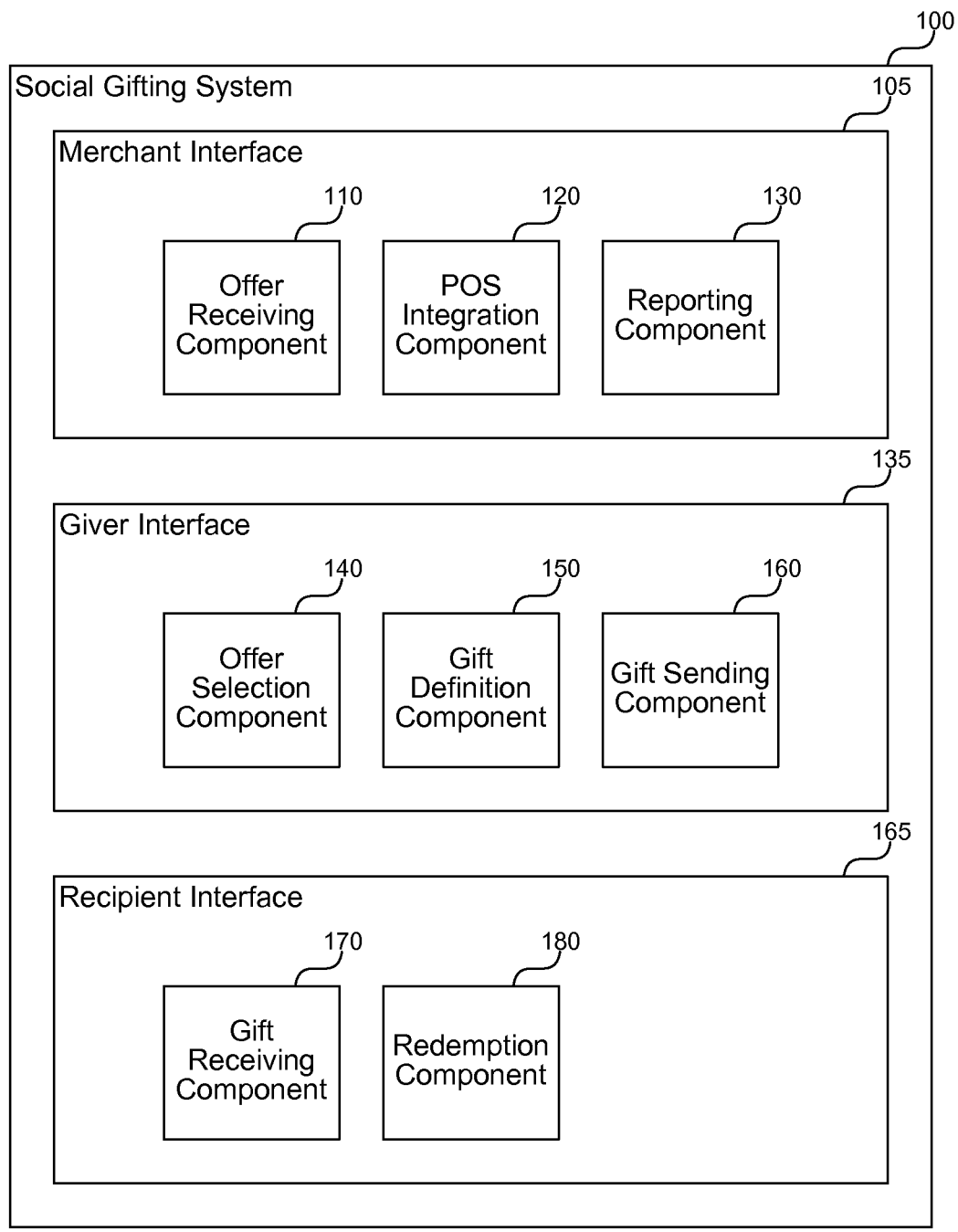
FIG. 1 is a block diagram that illustrates components of the social gifting system, in one embodiment.

A social gifting system is described herein that provides digital, personalized gifts that are both temporally and spatially relevant to a gift recipient. Gifts given using the social gifting system are cheaper, quicker, and more palatable to consumers. A gift giver who knows his or her friend will be at a restaurant or bar can use a computing device to send the friend a drink without being physically present at the establishment. In some embodiments, the giver can use a mobile application to select a friend (e.g., via Facebook or other social network), select a gift (e.g., via mobile application that displays menu offerings of various merchants and may use the recipient's shared location information), and send the gift electronically to the recipient. The recipient can use a mobile computing device to receive the gift, provide a code or other redemption information to a vendor (e.g., a bartender), and then receive the gift.

In some embodiments, the social gifting system provides new ways to make these types of digital gifts easier to redeem through point of sale (POS) integration with various common vendor systems. The social gifting system provides a proprietary process flow between the user and merchant staff that is set up for increased ease of use, speed, and simplicity. The system provides one or more user interfaces that have been highly refined based on years of restaurant experience so that they are incredibly intuitive and easy to use for restaurant staff. One example is a code-based verification methodology to ensure that fraudulent activity does not take place, and that gifts are not redeemed accidentally or more than once.

The social gifting system allows users to send highly personalized gifts in any form, such as specific drinks, bottles of wine or champagne, food and dessert items, or other experiences outside of hospitality such as concert tickets, sporting event tickets, ski resort tickets, and the like. The system also allows the gift giver to bring the price point of a gift down so that he is able to send more gifts to more friends without appearing cheap. These gifts can be presented to the recipient digitally using his or her smartphone or other commonly carried mobile device. In some embodiments, a mobile application reminds the recipient that the recipient is close to a merchant for which a gift has been received (e.g., using geofences or other location-based technology) and at a periodic interval so that the chances of redemption are much higher. This is good for the merchant because of the overspend associated with the average customer visit, as well as the opportunity to gain a new customer, and good for the recipient because he or she is more likely to use and enjoy the gift. Thus, the social gifting system leverages modern technology to improve the process of giving and receiving gifts.

The social gifting system provides a variety of components to implement the techniques described herein. In some embodiments, the system includes a custom tender interface installed/embedded into proprietary POS systems such as Micros, Dinerware, and gBridge with which servers at restaurants and other locations commonly interact. Examples of each of these are described in further detail in the following paragraphs.

In Micros environments, the system may install a combination of a custom Micros proprietary "SIM" and a locally installed service or an open database connectivity (ODBC) connection to a cloud database associated with the social gifting system. The SIM can communicate with a custom service on a local Micros server, which can communicate with an API of the social gifting system. The SIM is copied to each Micros terminal and performs the local logic needed by the system. In some embodiments, the system may use database calls that utilize an ODBC connection on the Micros server, while in other embodiments the system may use service/interface calls. The SIM allows for user interaction and performs the necessary logic and functions required by Micros to post the appropriate amount(s) to the check. The SIM uses existing or code-generated windows and touchscreen keys for various user interfaces.

The SIM interface provides support for a verification (e.g., alphanumeric or 3-digit) code input, displaying the gift recipient's name (e.g., for confirmation), displaying the gift item name, an ability to confirm a single item for redemption, an ability to confirm multiple items for redemption, an ability to confirm stored value (digital gift certificate) for partial or full redemption—all of which simultaneously both apply the tender and tip to the check as an output and initiate expunging of the gift from the recipient's account with the social gifting system.

In Dinerware environments, the system installs a custom set of dynamically linked libraries (DLLs) and configuration files that are developed specifically to work with Dinerware. The DLLs may utilize web services to communicate with an API of the social gifting system or ActiveX Data Objects (e.g., ADO.net) to communicate with a SQL Azure cloud database associated with the social gifting system. The DLLs are installed on the Dinerware "Brain" computer and are copied to each workstation via the Dinerware software. Like the Micros SIM, the Dinerware DLLs provide a user interface for interaction between the merchant and social gifting system. In addition to custom logic to compute the correct amounts, the DLLs implement interfaces form the core Dinerware code (required by Dinerware) to post the tender and tip amount(s) to the check.

The gBridge application can run on any web browser. As one example, the social gifting system may install an iPod Touch or other device preconfigured with the needed information and location-specific encrypted uniform resource locator (URL) saved as a home screen link. gBridge provides a two-step redemption process for merchants that have a point of sale system. In some embodiments, gBridge is an Azure-hosted ASP.net web application utilizing secure sockets layer (SSL) and URL encryption for security, although other implementations are possible. The web forms may be skinned to look like an iOS application or other appropriate look. The communication with the cloud database can be done via an API exposed by the social gifting system or common interfaces like ADO.net.

During the redemption process, the social gifting system may provide random and temporary codes for real-time validation of single or multiple named items.

For example, when a recipient wants to redeem a gift, he or she may press a button in a mobile application associated with the system to generate a code that can be used to redeem the gift in a predefined time (e.g., for the next hour). The recipient conveys the code to his or her server, who then enters the code into the POS system used at the merchant partner's location. The system may also include a method for automated assignment of tip and tax (specific to location) on a POS check. The code is chosen to be easy to communicate between the recipient and merchant partner representative (e.g., the server) while also being sufficiently complex to deter fraud or guessing of the code by those other than recipient.

The following paragraphs further describe the process, in some embodiments, of using the social gifting system in the context of the earlier example implementations integrated with Micros, Dinerware, and gBridge.

The Micros SIM file provided by the social gifting system is deployed to each Micros terminal within a merchant environment via the Micros server. Touchscreen buttons are configured in Micros to call specific events programmed in the SIM. To get the location-specific configuration settings, the SIM may query the local service to read the social gifting system configuration. This configuration information may include the location ID, venue ID, and tender numbers to use in Micros, each of which may be stored on the local service or each terminal.

There is one main event for redeeming social gifting system gifts. The SIM event allows the user to enter the random, temporary code given to the customer via mobile application or other interface. Once the code is entered, it is verified using a call to the social gifting system (e.g., using the local service and an API exposed by the social gifting system). If valid, the needed data is returned to the SIM and displayed on screen for the user to confirm. The data displayed includes the customer name and item specific data (e.g., item names and prices including tax and tip). In the case of multiple items, the user has the option of selecting all items that the customer redeemed or choosing only single items if the customer inadvertently redeemed too many items. For single and multiple item gifts, the item, tax and tip amounts can be dynamically returned, based on the specific location. This allows for varying item and tax rates by location within a brand. In the case of a gift certificate, the user is told what amount from the stored value will be applied to the check. This is currently either the balance of the certificate or the check total, whichever is less.

The user either touches a specific item or gift certificate to confirm it or, in the case of multiple items, selects a "Redeem All" button. An authorization code is generated by invoking an API exposed by the social gifting system and passed back in a redeem procedure for each gift being redeemed. When all selected gifts are redeemed, the SIM calculates the correct amounts split between payment to be applied to the check and tip. For gift certificates, the unused portion remains available for the customer to redeem on a future visit.

In some embodiments, another SIM event is installed on the touchscreen for voiding gifts. This event provides the ability to reverse gifts redeemed on Micros and return them to the customer. The user selects a redeemed gift in the check detail area and then touches an associated button (e.g., the Micros void button), calling the specific event. The SIM gets the authorization number from the redemption detail in Micros and uses it to send a call to the social gifting system. This process reverses each redemption and makes them available for the customer to see again in their mobile application. At the same time, they are also available for the merchant to redeem again, in the case of a mistake where the gift actually does need to be redeemed. The original code will still work, providing it is within the expiration time.

In some embodiments, with each redemption, the social gifting system collects some pieces of data for analytics. This may include the server ID number, the check number, the check total, tip, and the value redeemed for each gift.

The custom Dinerware DLLs that are installed by the social gifting system on each workstation are called when the system's tender method is selected in Dinerware. This is configured during installation by manually or automatically updating the newly created tender in the Dinerware database and setting fields for the external "transaction provider" name. When the custom DLL is called, all interaction and logic is completed before passing back the amounts and authorization codes to be posted to the check in Dinerware. The DLLs can use .Net Windows forms for user interaction.

At first, the user is prompted to enter the code generated by the social gifting system. The code is verified and data is returned to the screen. Depending on the type of scenario, information may be displayed differently. For both single and multiple item scenarios, the user is presented with a breakdown of the value of the gift(s), gift name(s), and the customer name. This may include item amount, tax amount, tip amount, and total amount. The prices and taxes returned will vary based on the location. For gift certificates, the user is presented with the customer name, the balance of the certificate, and the amount that will be redeemed. In the multiple-item scenario, the user has the option to unselect specific gifts.

When the user is ready to confirm and redeem, the user selects a redeem option. The system loops through each gift selected and sends a call to redeem it to the system API. When complete, the system tender is posted to the check in Dinerware with an authorization code. This code may include each of the gift ID values from the system and is used in the case of a void. The totals that are actually posted to the check in Dinerware can vary based on the total due. In some cases, the amount of the gift redeemed may be lower than the purchase price if it would cause an overpayment. In this scenario, logic is performed to modify the amounts. The user is warned on screen when this happens.

Once the redemption is complete, the user is given the option to close the check or make another payment if the social gifting system was not the only payment. If a mistake was made, the user simply touches the payment posted on the check and, if confirmed, the payment is voided, and all gifts that were redeemed are reversed in the system database.

Following is an example process using gBridge. On the computing device, the user brings up the web application saved to the home screen. This web application may only be accessible using a certificate and an encrypted URL, or just an encrypted URL. The application goes through a similar process as the steps outlined for Micros and Dinerware, but may ask the user to manually enter some data. The first step is to enter the system-generated code. The code is verified by the social gifting system and data is returned to the screen of the computing device. The user can modify the gifts to redeem in the case of multiple items. The user enters the check number and the original check total. For gift certificates, the user enters the amount to redeem, which cannot exceed the check total.

When redeemed, the user is given a confirmation page with the breakdown of amounts to be used in their POS system, including base amount and tip amount. If the redemption needs to be reversed for any reason, the user is able to enter the original redemption code and select void on the main screen instead of redeem. Once confirmed, the redemption is reversed and all gifts are returned to the customer.

FIG. 1 is a block diagram that illustrates components of the social gifting system, in one embodiment. The system 100 includes a merchant interface 105, a giver interface 135, and a recipient interface 165. The merchant interface 105 includes an offer receiving component 110, a POS integration component 120, and a reporting component 130. The giver interface 135 includes an offer selection component 140, a gift definition component 150, and a gift sending component 160. The recipient interface 165 includes a gift receiving component 170 and a redemption component 180. Each of these components is described in further detail herein. Although shown separately, those of ordinary skill in the art will recognize that various components may be implemented together or separately for the efficient operation of any particular implementation of the system 100. For example, a single mobile application may implement both the giver interface 135 and receiver interface 165, as any given person may at some times send gifts and at other times receive them.

The merchant interface 105 contains those parts of the system 100 that are provided to a merchant or other party that wants to offer items through the system 100 that can be sent as gifts between users. The merchant interface 105 receives offerings for items that are placed in a catalog of items from which a gift giver can select at the time of gifting to a gift recipient. The merchant interface 105 also handles the portions of gift redemption that go through a host/hostess, server, or other associate of a restaurant or other venue that redeems offerings gifted through the system 100.

The offer receiving component 110 receives information from a merchant describing one or more items available from that merchant to be sent as gifts between users of the system 100. Various implementations may allow different parties to define offerings, such as a home office of a restaurant chain, a marketing department of a retailer, a franchisee or local location of a particular store, and so forth. Defining an item that is available as an offering may include receiving various information, such as a picture of the item, a price for the item, a description of the item, or other information. Associates of the merchant may also use the offer receiving component 110 to update previously submitted items, such as to offer a sale on a particular item (e.g., for a limited time). Each merchant may maintain a catalog of items with the system 100, and may use the offer receiving component 110 to upload and update the catalog with item details from time to time. The system 100 may then maintain a catalog of items available from all merchants, and present the catalog data in various forms to gift givers from which to select gifts.

The POS integration component 120 provides software for integrating redemption logic of the system 100 with a merchant's existing point of sale terminal software. Most restaurants and some other vendors use one of several available terminal computing and software platforms to manage the bills of their customers and guests. By integrating with these platforms, the system 100 allows gifts given to directly pay for billed items tracked by the merchant's point of sale system. The POS integration component 120 may include the installation of software on the terminals at a merchant location, installation in a data center accessed by the merchant's terminals, or other setup that will allow the redemption of offerings from the system 100 in the flow of a merchant's regular checkout process. In the case of e-commerce, the integration may include receiving a code or other identifier during a checkout process that the gift recipient performs, in which case the point of sale is the recipient's own computing device.

The reporting component 130 prepares one or more reports for each merchant so that the merchant can track use of the system 100 with respect to the merchant's offerings by gift givers and recipients. For example, the system 100 may provide a report indicating a dollar amount of offerings per month, the number of unique users that sent and/or received offerings, additional engagement with the merchant driven by the system 100, which offerings are most popular, times of day that particular items are popular, and other information useful to the merchant. In some embodiments, the system 100 may receive feedback from givers and/or recipients about the merchant's offerings that the system 100 conveys to the merchant in detail or summary form using the reporting component 130 so that the merchant can improve his/her offerings.

The giver interface 135 contains those parts of the system 100 that interact with a gift giver. The interface may include one or more web pages, mobile software applications, desktop applications, externally exposed application programming interfaces (APIs), or other interfaces that the gift giver can access. In some cases, portions of the giver interface 135 may be integrated with other systems or applications, such as an extension or social media application (e.g., that integrates with Facebook or other service).

The offer selection component 140 provides an interface through which a gift giver can select an offering to send as a gift to a gift recipient. The component 140 may include an interface for browsing a catalog of items offered by one or more merchants. For example, the component 140 may provide a hierarchical list that the giver can drill down in to select a merchant (e.g., Bob's Steakhouse), item type (e.g., beverages), and specific item (e.g., raspberry mojito). The offer selection component 140 pulls item information from the set of items specified to the system 100 by merchants and presents that information to gift givers. Depending on the implementation, that information may take a variety of forms, such as a digital image of each item, cost of the item, description of the item, availability of the item, and other information.

The gift definition component 150 receives information from the gift giver indicating who will be the gift recipient and what the gift will be to form a gift definition. The component 150 may also receive additional information, such as a gratuity to be paid by the gift giver in addition to the cost of the selected gift item. The gift definition component 150 may present an interface through which the giver can select from users known to the giver to identify a recipient. For example, the component 150 may track a recent history of users that the giver has given gifts to or received gifts from, may access contact information from the giver's social networks (e.g., Facebook friends list), may access other contact information associated with the giver (e.g., a mobile phone contacts application and/or data store), and so on. The gift definition component 150 may also receive other terms or limitations of the gift, such as whether the giver wants to be identified to the recipient or anonymous, any time limit for redemption of the gift, alternative gifts that the recipient could choose in lieu of the gift, and so on. The gift definition component 150 may also present a confirmation screen that allows the giver to see in one interface each of the selections made by the giver to confirm those selections before sending the gift to the recipient.

The gift sending component 160 receives the gift definition and transmits information describing the gift to the system for delivery to the gift recipient. Transmission of the gift may include storing the gift definition on one or more servers managed by the system (e.g., in a datacenter or cloud storage facility), as well as notification to the gift recipient. Notification and other communication with users of the system may occur via push notifications to a mobile or other computing device, email, text message, telephone call, postal mail, or other common forms of electronic or other communication. Upon sending the gift, the gift sending component 160 may provide confirmation to the gift giver, such as via a popup notification or email. In addition, the system 100 may also inform the giver when the recipient has received and/or redeemed the gift.

The recipient interface 165 contains those parts of the system 100 that interact with a gift recipient. A recipient receives a gift, typically in the form of information about the gift (e.g., a picture of an item) and a code or other identifier for redeeming the gift.

The gift receiving component 170 receives the gift transmitted by the gift giver and displays information describing the gift and how to redeem the gift to the gift recipient. The gift receiving component 170 may receive a notification from the system 100 that informs the component 170 that a new gift is available and stored on the system's 100 server. The gift receiving component 170 can then access information about the gift and provide human readable information, such as a popup image of the gift to the gift recipient. The information displayed to the recipient may include the gift giver's name (or not in the case of an intentionally anonymous gift), a digital image of the item, any limitations on the gift (e.g., a time limit for redemption), where the gift can be redeemed (e.g., if not the recipient's current location), and so forth. The component 170 may allow the recipient to save received gifts for a period and review recently received gifts to later redeem them (e.g., at the end of a meal or when closing a tab).

The redemption component 180 handles the exchange of payment from the gift giver to the merchant on behalf of the gift recipient. Having received a gift, the gift recipient then wants to use the gift. The gift may be a consumable item, such as a food or beverage at a restaurant, which would customarily be paid for when the recipient closes his or her check before leaving the merchant. The gift giver need not be present with the gift recipient, but the merchant does expect to be paid and the system 100 seeks to reduce the burden of redeeming the gift on the recipient as much as possible. In one embodiment, when the recipient is ready to redeem the gift (e.g., when paying his or her check or tab), the recipient accesses the system's 100 recipient interface 165, requests an identifier associated with the gift (e.g., a onetime alphanumeric code generated by the system), and gives that identifier to a waiter, waitress, or other associate of the merchant.

The associate of the merchant can then apply the identifier through the POS integration component 120 when closing the recipients check. Doing so transfers funds electronically from the gift giver to the merchant (e.g., via credit card, automated clearinghouse (ACH) withdrawal, or other credits from the gift giver (e.g., a gift card the giver has from the merchant)). In some cases, the gift may include a gratuity paid by the giver on the gift, and this may be broken down on a bill provided to the recipient by the associate. The bill may include other items, taxes, and gratuities not paid by the giver for other items purchased by the recipient. In this way, gift givers can give to recipients at a very micro level (e.g., single item or even portion of an item) at a time and place that are relevant and well received by the gift recipient.

The computing device on which the social gifting system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
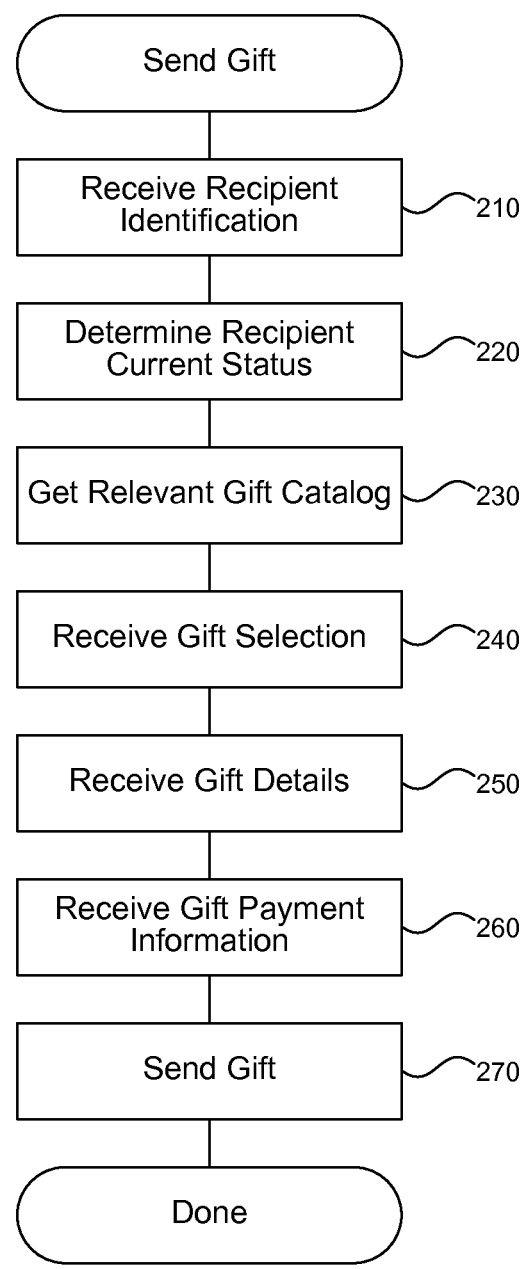
FIG. 2 is a flow diagram that illustrates processing of the social gifting system to send a gift from a gift giver to a designated gift recipient, in one embodiment.

FIG. 2 is a flow diagram that illustrates processing of the social gifting system to send a gift from a gift giver to a designated gift recipient, in one embodiment. Beginning in block 210, the system receives an identification of a gift recipient from the gift giver. The system may provide a list of possible gift recipients or the recipient's identity may come from external systems. For example, the gift giver may identify the recipient using a social network friends list, a contact list in a personal information manager (PIM) application, by specifying information about the recipient known to the giver (e.g., an email address, phone number, name, or other), or any other manner of identifying a particular recipient. The gift giver selects the recipient and identifies the recipient to the system. In some cases, the gift giver has a specific person in mind from the outset and uses one or more interfaces provided by the system to send that person a gift.

Continuing in block 220, the system determines a current status of the identified gift recipient wherein the status provides information to allow a gift to be delivered that is timely and relevant to the gift recipient's current activity. In some cases, the system may determine the gift recipient's present location (e.g., coordinates or a location name/type, such as a particular restaurant name), present activity (e.g., dining out, sitting at work, sitting at home, and so forth), upcoming activity (e.g., about to leave for drinks with friends), or other information that allows a timely gift to be selected.

Because of the long time difference between when gifts are purchased and used in traditional systems, it is not possible with these systems to provide a timely, relevant gift in a short space of time. For example, a gift giver in the past might buy a gift card for the gift recipient on one day, deliver that gift card to the recipient over several more days, and then the recipient might wait even more days to use the gift card or forget to use the gift card at all. In contrast, the social gifting system allows all of these steps to occur within the same day and often as rapidly as a few minutes. A gift giver might decide to give a gift, identify the recipient, find out where the recipient is right now, and send a gift in seconds that provides something to the recipient at his or her current location. The recipient can then use the gift immediately upon checking out at their current activity.

Continuing in block 230, the system accesses potential gifts from a gift catalog that are relevant to the identified recipient's current status and presents information describing the potential gifts to the gift giver for selection. For example, if the gift recipient is determined to be sitting at a Starbucks coffee shop based on the recipient's current status, then the system might access a set of offerings previously provided to the system by Starbucks. Thus, the catalog provided to the gift giver to select from contains items that the gift recipient could immediately receive and use. At another time, the system may provide a different set of items from a global catalog of items provided by many merchants. The system may use a variety of criteria to filter the available gift items. In some cases, the system may allow the giver to browse the entire catalog and drill down as the giver chooses. In other cases, the system may make a limited set of suggestions that includes a much smaller list based on the recipient's current activity or upcoming scheduled activity.

Continuing in block 240, the system receives a gift selection from the gift giver from the potential gifts. The gift giver may use a web page, mobile application, or other tool to access the list of gifts, scroll through and receive extra details about each gift, and then to select a particular gift that the giver will send to the recipient. In some cases, the system may allow the giver to select a less specific gift to give the recipient or merchant a hand in the choice, such as selecting a particular category of item (e.g., I want to send Anne a drink, where the merchant or Anne could select the particular drink). In other cases, the giver may select a very specific item, such that the recipient can only redeem the gift for that item. In some embodiments, the merchant may still influence the choice even when a specific gift is chosen, such as by offering the recipient a chance to exchange the received gift if the recipient prefers a different item (e.g., that the merchant is more motivated to sell). The giver may also specify multiple gift items to be provided to the recipient in the same instance.

Continuing in block 250, the system optionally receives additional details from the gift recipient related to the gift. The system may provide various options related to gifts, such as the ability for the gift giver to pay gratuity, taxes, or other charges associated with the gift. The system may also allow the giver to specify whether the system will present the gift to the recipient anonymously or will identify the gift giver. Other details may include a private message from the giver that is delivered to the recipient along with the gift, a precondition for receiving the gift, and so forth.

Continuing in block 260, the system receives payment information from the gift giver that authorizes the system to charge the giver for the gift when the gift is redeemed by the recipient. In some embodiments, users of the system may maintain accounts with the system that have a certain amount of credit, pre-deposited funds, authorization to charge a credit card, auto-recharge policies for replenishing an account, or similar. The system may pre-charge the gift giver to secure funds for the gift purchase even before the gift is redeemed by the recipient or may wait and charge the giver when the gift is redeemed.

Continuing in block 270, the system sends information describing the gift to the identified recipient in accordance with any additional details provided by the gift giver. Sending a gift may encompass a variety of sub-activities or states managed by the system. For example, the system may store information describing the gift in a database managed by the system, pre-charge the giver's payment method, and then notify the gift recipient about the gift. The notification may include a push notification, email, text message, voicemail, or other type of communication. In some cases, the system attempts to reach the recipient in the timeliest manner available, such as using a method that the recipient can get from his or her smartphone. After block 270, these steps conclude.

Figure 3:
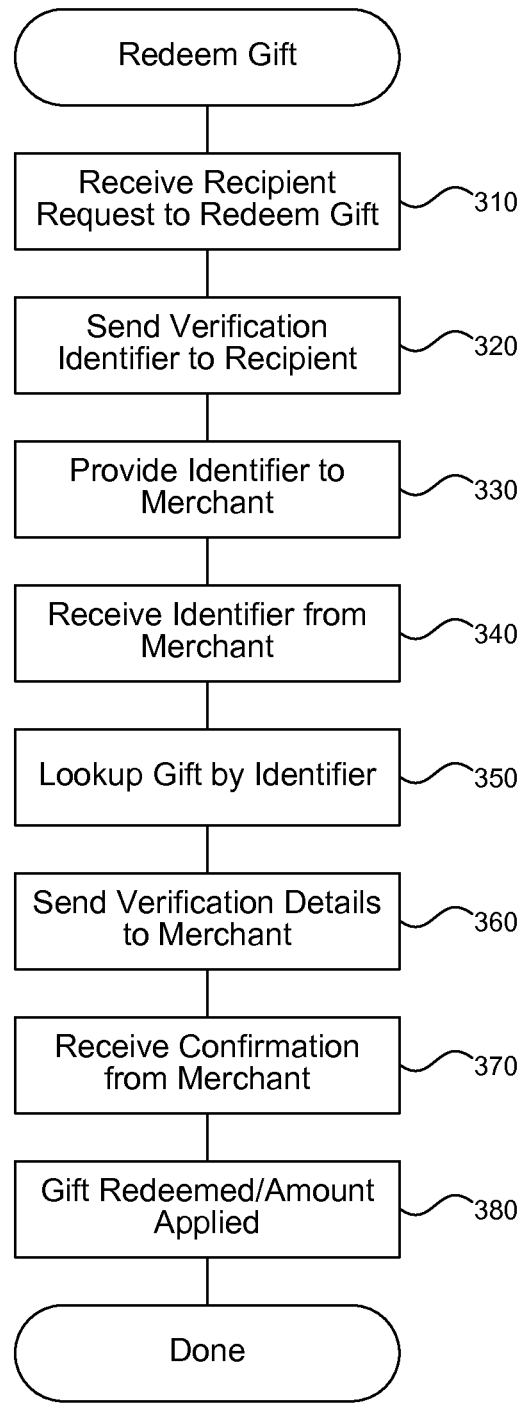
FIG. 3 is a flow diagram that illustrates processing of the social gifting system to redeem a gift on behalf of a gift recipient, in one embodiment.

FIG. 3 is a flow diagram that illustrates processing of the social gifting system to redeem a gift on behalf of a gift recipient, in one embodiment. Following the steps described herein with reference to FIG. 2, the recipient decides to use the gift, and the system receives a request to that effect from the recipient. Beginning in block 310, the system receives a request from the gift recipient to redeem a gift received by the gift recipient. The gift recipient may access a mobile application, web page, or other interface associated with the system to express his or her interest in receiving the gift. In doing so, the recipient may identify one among multiple received gifts to indicate to the system which gift the recipient currently wants to redeem. In some embodiments, the system may also receive a communication or other information from the recipient to the giver, such as a thank you or other message related to the gift.

Continuing in block 320, the system sends a gift verification identifier selected to provide a level of authentication of the gift during communication of the gift between recipient, a merchant, and a backend service associated with the system. The gift verification identifier prevents anyone from fraudulently claiming they have received a gift that they have not received, and prevents one user from redeeming a gift given to someone else. In some embodiments, the system generates the gift verification identifier upon receiving the request to redeem the gift, provides the identifier to the recipient in a manner that only the recipient should have possession of the correct identifier (e.g., on the recipient's mobile computing device), and time limits validity of the identifier to provide a sufficient window of uniqueness to the identifier.

The gift verification identifier can be any manner of identifier that provides the above properties. For example, the identifier could be a numeric PIN (e.g., 1234), an alphanumeric code (e.g., A1B2), a passphrase (e.g., "cat"), or any other identifier that can be conveyed from the system to the recipient and then from the recipient to the merchant. In some embodiments, the recipient may hand the merchant his or her mobile device and the merchant may use the device to deliver the verification code (e.g., by flashing a code on the screen that is read by the POS terminal, by using near field communication (NFC) to transmit the identifier, or other similar method). In such cases, the identifier may be a more secure, less human-friendly entity (e.g., a globally unique identifier (GUID), cryptographic hash, or similar).

Continuing in block 330, the system requests that the gift recipient provide the gift verification identifier to the merchant. For example, the recipient's mobile device may display a dialog box instructing the recipient to tell the gift verification identifier to an associate of the merchant, such as a waiter, waitress, or bartender. The recipient may also tell the merchant which items the recipient is redeeming a gift for, or the merchant may determine this manually during the checkout process.

Continuing in block 340, the system receives the gift verification identifier from the merchant. As described herein, the system provides a merchant-facing interface that includes POS integration with popular POS platforms. The system may include a button on the POS screen that allows the specification of a gift managed by the social gifting system, and upon activating the button, the system may request that the associate of the merchant enter the verification identifier.

Continuing in block 350, the system looks up one or more gifts based on the received gift verification identifier. The system may generate gift verification identifiers in a manner that allows determining which gift the identifier refers to with no additional information. In such embodiments, the system generates identifiers that are sufficiently unique for a period of time that prevents overlap in identifiers that are redeemed during the same period. For example, if the system receives an average or peak incoming rate of redemptions of 10 per hour (a simplified example), and allows verification identifiers to remain valid for an hour, then the system may choose a space of 100 identifiers to be able to give out 10 that are substantially unique. Upon finding the gift based on the identifier, the system can access any additional information stored with the gift, including the identity of the recipient and/or giver, the gift name and/or description, one or more items associated with the gift, the price of the gift item or items, and so forth.

Continuing in block 360, the system sends verification information to the merchant that allows the merchant to confirm that one or more items purchased by the recipient match one or more items associated with one or more gifts identified by the gift verification identifier. For example, if the gift is for a single soft drink to a person named Frank, then the system may pop up a dialog box indicating to the associate that information, which the associate can then compare to the information on the ticket (e.g., the ticket is for a person named Frank, and he did order a soft drink).

Continuing in block 370, the system receives confirmation from the merchant that the verification information matches the recipient's purchase information. The system may display an interface asking for confirmation from the merchant that includes a "yes" and "no" button that the merchant can select to indicate confirmation or a mismatch between the information. In the case of a mismatch, the associate may ask the gift recipient to request another gift verification identifier and perform this process again or may void the gift altogether in some cases.

Continuing in block 380, the system redeems the gift and applies a tender amount associated with the gift to a bill associated with the recipient. For example, the gift giver may have gifted a soft drink that costs $2, the recipient may have ordered such a soft drink at a restaurant, and upon redemption of the gift, the merchant will apply the gift to the bill using the POS platform during closing of the bill. The bill may then include a line item showing the application of the gift, so that the recipient can verify that the bill is correct and that the gift did decrease the charges owed. In addition, if the gift giver specified any additional amounts to cover gratuity, tax, or other fees, then the bill may reflect these items as line items as well. The recipient then pays the remainder of the bill in the usual manner (e.g., by providing his or her own credit card, cash, or other payment method). After block 380, these steps conclude.

In some embodiments, the social gifting system uses quick response codes (QR codes) in place of a generated numeric code. The system provides a reverse flow where the user scans the code or inputs the check number. This scenario provides a different redemption experience where the customer can insert their own payment on the check in POS by either scanning a QR code printed on the guest check or just entering the check number in the mobile application. The customer performs a similar process to the merchant workflow, but will be able to complete the transaction without interacting with the merchant staff.

In some embodiments, the social gifting system leverages near field communication (NFC) in the redemption process.

For example, gift recipient may tap or bump his or her NFC-enabled mobile device against NFC receiving hardware at the merchant location. The NFC bump may transfer data, such as identifying information about the gift recipient, gift(s) to be redeemed, authentication information, and so forth.

In some embodiments, the social gifting system generates codes of configurable length that may include alphanumeric characters. Great complexity in the codes allows increasing the number of redemptions outstanding at a time within the same brand.

In some embodiments, the social gifting system integrates with Micros POS terminals by transitioning the communication layer to a service application installed on the Micros server, which replaces the ODBC connection. At the same time, the new service communicates with a cloud-based service that acts as the service layer between the merchant and the cloud database. In addition, the local service performs a few other functions, including updates and check detail extraction.

In some embodiments, the social gifting system integrates with Dinerware POS by changing the method of communication between the merchant and system in the DLLs by moving away from ADO.net and adding a Windows Communication Foundation (WCF) layer. This method of operation includes a locally installed service application that allows software updates and check detail extraction. The gBridge implementation may also be updated to use a client service layer to communicate with the cloud service. The system may also be updated to support other POS systems, such as Aloha and Maitre'D.

Although specific point of sale platforms with which the social gifting system can interoperate have been mentioned in examples herein, the system can interoperate with numerous other available POS platforms. Other examples of POS platforms are Aloha, NCR, HarborTouch, Positouch, Aldelo, FuturePOS, Square, Pixel Point POS, Maitre'D POS, Halo POS, ISIS, HSI POS, First Data, Café Cartel, wBox, Focus Restaurant Management Software, Restaurant Manager, Digital Dining, Breadcrumb, POS Lavu, Shopkeep, Leaf, Revel Systems, and WaveSoft.

From the foregoing, it will be appreciated that specific embodiments of the social gifting system have been described herein for purposes of illustration, but that various modifications may be made without deviating from the spirit and scope of the invention. Accordingly, the invention is not limited except as by the appended claims.

We claim:

1. A gift processing system comprising:
a point-of-sale (POS) terminal;
a gift-recipient mobile wireless communications device associated with a gift recipient, and having a mobile application stored thereon;
a gift-provider electronic device associated with a gift provider; and
a gift-processing server coupled to the gift-recipient mobile wireless communications device and the gift-provider electronic device, the gift-processing server comprising:
a memory configured to store a list of gifts and associated redemption locations, and
a processor coupled to the memory and configured to:
obtain, via the gift-provider electronic device, a gift recipient identifier associated with the gift recipient;
determine a geographic location of the gift recipient based upon communication with the gift-recipient mobile wireless communications device and the gift recipient identifier;
determine available gifts from the list of gifts for redemption at a given one of the associated redemption locations based upon the determined geographic location;
obtain, via the gift-provider electronic device, a selected gift from the determined available gifts for gifting to the gift recipient;
communicate notification of the selected gift to the gift recipient via the gift-recipient mobile wireless communications device; and
receive, via the gift-recipient mobile wireless communications device, a redemption request for the selected gift, and when the redemption request for the selected gift is received:
generate a gift verification identifier associated with the selected gift and the gift recipient identifier; and
communicate the gift verification identifier to the POS terminal at the given associated redemption location;
the POS terminal configured to print the gift verification identifier on a guest check, wherein the guest check is associated with a transaction:
the gift-recipient mobile wireless communications device configured to:
obtain, via the mobile application, the gift verification identifier from the guest check for redemption of the selected gift; and
in response to obtaining the gift verification identifier from the guest check, redeem the selected gift and complete the transaction associated with the guest check via the mobile application, wherein the redemption of the selected gift and the completion of the transaction are performed at the gift-recipient mobile wireless communications device without cooperation with the POS terminal.

2. The gift processing system of claim 1, wherein the processor is configured to receive, via the gift-provider electronic device, payment information from the gift provider and apply payment toward the selected gift based upon the payment information and a confirmation of the redemption.

3. The gift processing system of claim 2, wherein the payment toward the selected gift comprises a payment equal to a purchase price of the selected gift.

4. The gift processing system of claim 2, wherein the payment toward the selected gift comprises a payment equal to a purchase price of the selected gift, a gratuity, and applicable tax.

5. The gift processing system of claim 1, wherein the gift recipient has a tab at the associated redemption location including the selected gift; and wherein, upon confirmation of the redemption, the POS terminal and gift-processing server cooperate to apply a credit for the selected gift to the tab.

6. The gift processing system of claim 1, wherein the gift verification identifier has a valid redemption period associated therewith; and wherein the processor is configured to invalidate the gift verification identifier based upon expiration of the valid redemption period.

7. The gift processing system of claim 1, wherein the gift verification identifier comprises one of a numerical identifier, alphanumeric identifier, and a passphrase.

8. The gift processing system of claim 1, wherein the gift-recipient mobile wireless communications device comprises a camera and a processor cooperating to obtain the gift verification identifier from the guest check via scanning the gift verification identifier.

9. The gift processing system of claim 1, wherein the gift-recipient mobile wireless communications device comprises an input device and a processor cooperating to obtain the gift verification identifier from the guest check based upon input to the input device.

10. The gift processing system of claim 1, wherein the gift verification identifier comprises a quick-response (QR) code.

11. The gift processing system of claim 10, wherein the QR code comprises a guest check number.

12. A method of processing a gift comprising:
obtain, by a gift-processing server, via a gift-provider electronic device associated with a gift provider, a gift recipient identifier associated with a gift recipient;
determine, by the gift-processing server, a geographic location of the gift recipient based upon communication with gift-recipient mobile wireless communications device associated with the gift recipient and the gift recipient identifier, and having a mobile application stored thereon;
determine, by the gift-processing server, available gifts from the list of gifts for redemption at a given one of the associated redemption locations based upon the determined geographic location;
obtain, by the gift-processing server, via the gift-provider electronic device, a selected gift from the determined available gifts for gifting to the gift recipient;
communicate, by the gift-processing server, notification of the selected gift to the gift recipient via the gift-recipient mobile wireless communications device; and
receive, by the gift-processing server, via the gift-recipient mobile wireless communications device, a redemption request for the selected gift, and when the redemption request for the selected gift is received:
generate, by the gift-processing server, a gift verification identifier associated with the selected gift and the gift recipient identifier;
communicate, by the gift-processing server, the gift verification identifier to a point-of-sale (POS) terminal at the given associated redemption location;
print, at the POS terminal, the gift verification identifier on a guest check, wherein the guest check is associated with a transaction;
obtain, via the mobile application of the gift-recipient mobile wireless communications device, the gift verification identifier for redemption of the selected gift; and
in response to obtaining the gift verification identifier from the guest check, redeem the selected gift and complete the transaction associated with the guest check via the mobile application, wherein the redemption of the selected gift and the completion of the transaction are performed at the gift-recipient mobile wireless communications device without cooperation with the POS terminal.

13. The method of claim 12, further comprising receiving, by the gift-processing server, via the gift-provider electronic device, payment information from the gift provider and applying payment toward the selected gift based upon the payment information and a confirmation of the redemption.

14. The method of claim 12, wherein the gift verification identifier is obtained from the guest check by scanning the gift verification identifier using a camera of the gift-recipient mobile wireless communications device.

15. The method of claim 12, wherein the gift verification identifier is obtained from the guest check based on input received from an input device of the gift-recipient mobile wireless communications device.

16. The method of claim 12, wherein the gift verification identifier comprises a quick-response (QR) code.

17. The method of claim 16, wherein the QR code comprises a guest check number.

* * * * *

UNITED STATES PATENT AND TRADEMARK OFFICE
CERTIFICATE OF CORRECTION

PATENT NO. : 10,460,364 B2
APPLICATION NO. : 14/051628
DATED : October 29, 2019
INVENTOR(S) : Erke et al.

Page 1 of 1

It is certified that error appears in the above-identified patent and that said Letters Patent is hereby corrected as shown below:

In the Claims

| | |
|---|---|
| Column 15, Line 22, | Delete: "with gift-recipient" |
| Claim 12 | Insert: --with a gift-recipient-- |

Signed and Sealed this
Tenth Day of December, 2019

Andrei Iancu
*Director of the United States Patent and Trademark Office*